Aug. 5, 1969   F. H. SMITH   3,459,464
OPTICAL DUAL MAGNIFICATION SYSTEM
Filed Jan. 25, 1966

United States Patent Office 3,459,464
Patented Aug. 5, 1969

3,459,464
OPTICAL DUAL MAGNIFICATION SYSTEM
Francis Hughes Smith, Purley Lane, Surrey, England, assignor to Vickers Limited, London, England, a British Company
Filed Jan. 25, 1966, Ser. No. 522,978
Claims priority, application Great Britain, Feb. 5, 1965, 5,224/65
Int. Cl. G02b 21/22
U.S. Cl. 350—40     5 Claims

ABSTRACT OF THE DISCLOSURE

A variable magnifying lens combination and a number of mirrors one of which can be placed in one position to direct a beam of light in one direction through the combination and removed to allow the beam of light to pass through the combination in the opposite direction to the first mentioned direction in order to obtain two magnification ranges for the same lens combination.

---

This invention relates to optical systems and is concerned with the provision of an improved form of variable magnification system and with the provision of a microscope incorporating such a system.

In a known and attractive form of variable magnification system, two alternative magnifications are obtained from one and the same magnifying lens combination by rotating the lens combination through 180° about an axis perpendicular to the optical axis of the combination, the axis about which the combination is rotated being substantially equidistant from the pair of conjugates established by the lens combination. This operation effectively reverses the direction of light transmission through the magnifying lens combination thus obtaining a second magnification which is the reciprocal of the original magnification.

A disadvantage of this form of variable magnification system is that the field of view is masked for the appreciable time required to rotate the lens combination.

The invention is concerned with the provision of a variable magnification lens system in which variation of magnification is obtained without the necessity for rotating the lens system.

A variable magnification system in accordance with one aspect of the invention, includes a magnifying lens combination and beam deflecting means external to said combination for directing an image-bearing beam of light in either of two opposite directions along the optical axis of the combination.

The invention is also concerned with the provision of a microscope of variable magnification in which change of magnification need not involve temporary interruption of the image-bearing beams of light.

According to another aspect of the present invention, a microscope includes for the image-bearing beam of light discharged from the objective of the microscope, a magnifying lens combination, and beam deflecting means for establishing two alternative light paths, said paths passing through the lens combination in precisely opposed directions.

Figure 1:
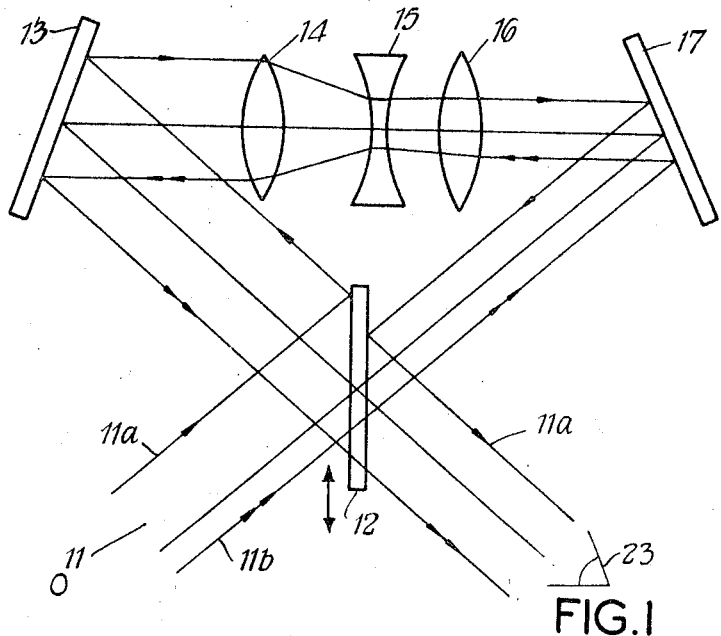
Figure 2:
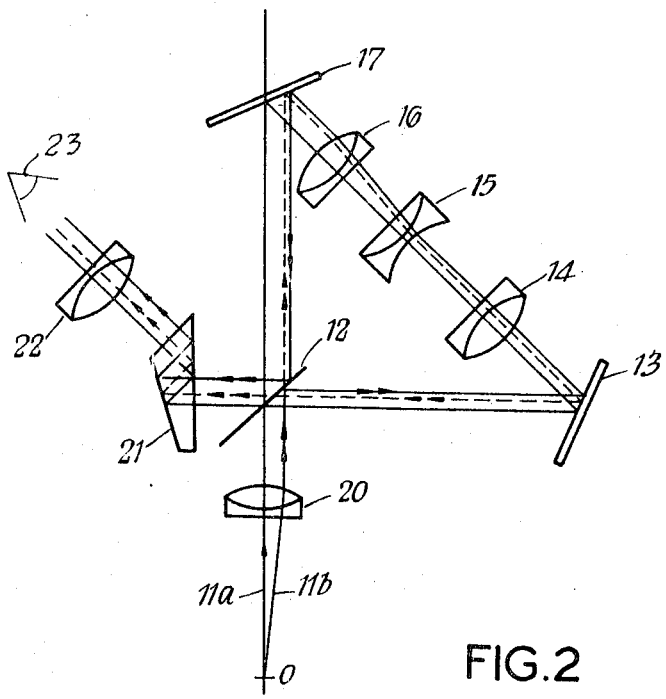

The principles underlying the invention may be more clearly understood by reference to the accompanying drawings in which:

FIGURE 1 is a diagrammatic representation of one form of variable magnification system in accordance with the invention, and FIGURE 2 is a similar representation of the system but showing the system as incorporated in a stereoscopic microscope, the optical elements shown in this figure constituting one-half of the microscope.

Referring to FIGURE 1, the system includes a double-sided mirror 12 and two first-surface mirrors 13 and 17 which are separated from one another by three individually corrected lens components 14, 15 and 16 at least one of which is translatable along the common optical axis of the lenses to provide an infinite variation of magnification over a finite range. Two representative rays in an image-bearing beam of light 11 are indicated at 11a and 11b respectively.

When the mirror 12 is in the position shown, the single ray of light 11a is reflected to the mirror 13 which, in turn, directs the ray from left to right through the lenses 14, 15 and 16. The resulting displacement of the ray 11a corresponds to a change of magnification which, in the present example, is equivalent to a magnification greater than unity. The mirror 17 then returns the ray 11a to the double-sided mirror which now reflects the ray in the direction shown.

If, now, the mirror 12 is moved or displaced, for example, manually in a simple slide mounting provided for the mirror so that it no longer intercepts the beam 11, light will consequently pass directly to the mirror 17 as indicated by the single ray of light 11b. It is there reflected from right to left through the lens components 16, 15 and 14 whereby it suffers an opposite displacement to the ray 11a so that the resulting magnification is less than unity. Thereafter the ray 11b is reflected by the mirror 13 along the same general direction as the ray 11a.

When, as in the example of FIGURE 1, the magnification system is infinitely variable, it is preferred that the system have unit magnification at one extreme limit of its working range so that switching of the mirror 12 at this extreme position would not significantly change the magnification of the loop system as a whole until the user begins to reverse the magnification control. For example, a typical range might be, ⅓ to 1. When the user moves from ⅓ to the limiting value of 1 he switches the mirror 12 so that reversal of the magnification control now takes him from 1 to 3 without appreciable interruption of view.

It is also preferred that the image-bearing beam suffer an even number of functional reflections within the loop because this causes the direction of the discharged beam to be insensitive to slight inclination errors of the mirror 12, which might result from the necessity of this mirror being movable.

The double-sided mirror 12 may comprise a glass plate with a localised fully-reflecting coating on opposite sides, leaving a transparent or partially transparent region which latter may be brought into the 11b operating position by appropriate translation of the plate. The objective O and the ocular 23 are located in the positions shown in FIGURE 1.

The invention is not restricted to the particular form of beam reversing means 12, 13 and 17 which is intended only to illustrate the basic principles.

The optical system may be employed in a stereoscopic microscope as indicated in FIGURE 2, to which reference will now be made and in which the components corresponding to those in FIGURE 1 have been given the same reference numerals. The image-bearing beam of light, represented by the optical-axis-defining ray 11a and the marginal ray 11b of the central pencil, diverges from the object O, and are then collimated by a corrected lens 20. When the mirror 12 is at the indicated operational position it reflects rays 11a and 11b to the mirror 13 which, in turn, reflects the rays through the magnifying lens system comprised by the corrected lenses 14, 15 and 16. Thereafter, the mirror 17 reflects rays 11a and 11b back to the opposite side of the mirror 12 where they are reflected through a half-pentagonal prism 21 to a corrected lens 22. Transmission through lens 22 causes rays 11a and 11b to converge to a focus, resulting in the formation of the required real image of the object O at the ocular 23.

When the mirror 12 is displaced from its operative position it no longer intercepts rays 11a and 11b which consequently reach 17, 16, 15 and 14 in reverse sequence, resulting in the magnifying lens system having an effective magnification which is the reciprocal of the original magnification.

The magnifying lens system is preferably infinitely variable, i.e. a zoom system, as indicated by the three doublets in the present figure.

In this zoom version of the magnifying system it is preferred that the zoom system be designed to provide unit magnification at one extreme limit of its range of magnification, so that beam reversal at this point produces no change of resultant magnification, the reciprocal of unity being unity.

Although the figure indicates only one optical system it will be appreciated that the system may readily be duplicated to form a matched pair so as to realise a stereoscopic microscope. In this case the image-bearing beam(s) discharged by the lens(es) 22 would, of course, subsequently pass through the conventional erecting prismatic system which is well known and common to virtually all stereoscopic microscopes before reaching the viewing eye-pieces.

It will be appreciated that the invention is equally applicable to a double-objective or single-objective form of stereoscipic microscope, since in the latter case there are still two image-bearing beams obtained from different regions of the single-objective lens.

It is preferred that the displaceable mirror have its operative position effectively equidistant from the conjugates provided by the magnifying system, since this condition prevents change of focus between the two alternative modes of operation. This includes the limiting case where the conjugates are infinite.

If, in the stereoscopic microscope, the two optical axes of the paired microscopes were parallel, it would be unnecessary to duplicate the mirrors 12, 13 and 17 since they could be made large enough to reflect both beams simultaneously. Stereoscopic microscopes with parallel axes are well known and generally employ a single large objectives 20 to provide both image-bearing beams.

I claim:

1. A variable magnification system including an array of spaced optical reflectors disposed so as to define a closed optical path in the form of a closed loop and for reflecting an image-bearing light beam around the closed loop, and a magnifying lens combination located in said closed loop and on the optical axis between and in spaced relation to the optical reflectors of said array, said closed optical path and loop having a region of beam intersection external to said magnifying lens combination and the optical reflectors of said array, a movable beam deflecting means located in said region comprising optical reflector means having two oppositely facing reflecting surfaces movable into one position for one magnification wherein the image-bearing light beam is allowed to pass in one direction around the closed path and through the lens combination without impinging upon said reflector means and to emerge from the system, and movable into a second position for a different magnification wherein said image-bearing light beam impinges upon said optical reflector means and is reflected by one of its reflecting surfaces in the opposite direction around said closed path and through said lens combination, and is reflected from the other reflecting surface to emerge from the system.

2. A variable magnification system as outliined in claim 1 wherein the magnifying lens combination comprises a plurality of optically cooperating lenses, at least one of which is translatable along said optical axis for varying the magnification of the lens combination over a finite range.

3. A variable magnification system as claimed in claim 1, wherein the movable beam deflecting means comprises a glass plate having a localized fully reflecting coating on opposite sides of the plate leaving a region which is at least partially transparent through which the image-bearing light beam may pass when the movable beam reflecting means is in said one position.

4. A variable magnification system as claimed in claim 1 wherein said system is included in a microscope having an objective from which said image-bearing beam of light is discharged for passage around the closed loop.

5. A variable magnification system as claimed in claim 1 wherein said system is included in a stereoscopic microscope having a pair of objectives from each of which an image-bearing beam of light is discharged for passage around a closed loop as defined in claim 1.

References Cited

UNITED STATES PATENTS

| 2,705,908 | 4/1955 | Walker | 350—187 |
| 2,974,573 | 3/1961 | Faasch | 350—202 |
| 3,345,912 | 10/1967 | Lohmann. | |
| 2,660,922 | 12/1953 | Philpot. | |
| 2,835,167 | 5/1958 | Pierce | 350—34 X |
| 3,030,857 | 4/1962 | Shumway | 350—40 |

FOREIGN PATENTS

| 1,100,317 | 5/1956 | Germany. |
| 1,342,725 | 9/1963 | France. |

DAVID SCHONBERG, Primary Examiner

PAUL R. GILLIAM, Assistant Examiner

U.S. Cl. X.R.

350—34